(12) United States Patent
Pucker et al.

(10) Patent No.: US 12,509,229 B2
(45) Date of Patent: Dec. 30, 2025

(54) GALLEY WATER PRE-WARMER FOR GALLEY INSERTS USING AIRCRAFT POTABLE WATER AND METHOD

(71) Applicant: The Boeing Company, Arlington, VA (US)

(72) Inventors: Andrew L. Pucker, Huntington Beach, CA (US); Thomas Joseph Moran, Lake Stevens, WA (US); Sami Movsesian, Glendale, CA (US)

(73) Assignee: THE BOEING COMPANY, Arlington, VA (US)

( * ) Notice: Subject to any disclaimer, the term of this patent is extended or adjusted under 35 U.S.C. 154(b) by 87 days.

(21) Appl. No.: 18/608,082

(22) Filed: Mar. 18, 2024

(65) Prior Publication Data

US 2025/0289572 A1    Sep. 18, 2025

(51) Int. Cl.
*B64D 11/00* (2006.01)
*B64D 13/06* (2006.01)
*B64D 13/08* (2006.01)
*F24H 1/00* (2022.01)

(52) U.S. Cl.
CPC .......... *B64D 11/0007* (2013.01); *B64D 13/08* (2013.01); *F24H 1/009* (2013.01); *B64D 2013/0674* (2013.01)

(58) Field of Classification Search
CPC .................. B64D 11/007; B64D 13/08; B64D 2013/0674; F24H 1/009
See application file for complete search history.

(56) References Cited

U.S. PATENT DOCUMENTS

| | | |
|---|---|---|
| 10,488,075 B2 | 11/2019 | Burd |
| 2005/0210910 A1 | 9/2005 | Rigney et al. |
| 2008/0087039 A1* | 4/2008 | Reed .................. B64D 13/06 62/498 |
| 2015/0089970 A1 | 4/2015 | Lu et al. |
| 2016/0007736 A1 | 1/2016 | Burd |
| 2025/0121942 A1 | 4/2025 | Pucker et al. |

FOREIGN PATENT DOCUMENTS

| | | |
|---|---|---|
| CA | 2914818 A1 | 12/2014 |
| DE | 102005063407 B4 | 4/2013 |
| WO | 2008008324 A2 | 1/2008 |

OTHER PUBLICATIONS

EP Search Report mailed May 28, 2025 in re EP Application No. 25154204.9.
EP Search Report mailed Jun. 25, 2025 in re EP Application No. 25154203.1.

* cited by examiner

*Primary Examiner* — Elizabeth J Martin
(74) *Attorney, Agent, or Firm* — COATS & BENNETT, PLLC

(57) ABSTRACT

Systems and methods for establishing a warmed potable water flow from an aircraft potable water supply with an ambient potable water supply directed from the potable water supply to provide at least supplemental cooling to a chilled air circuit, and where waste heat from the chilled air circuit is absorbed in a warmed potable water flow and with the warmed potable water flow directed to an aircraft galley water heating appliance as a pre-heated potable water bolus.

19 Claims, 12 Drawing Sheets

GALLEY WATER PRE-WARMER FOR
GALLEY INSERTS USING AIRCRAFT
POTABLE WATER AND METHOD

TECHNOLOGICAL FIELD

The present disclosure relates, generally, to the field of refrigeration on aircraft. More specifically, the present disclosure relates to the field of cooling and/or chilling galley carts on passenger aircraft.

BACKGROUND

Air chillers are typically added into passenger aircraft architecture to maintain a cooled or chilled temperature of food cart contents. Such aircraft architecture has typically required the installation of air duct components and air chiller components into existing aircraft architecture. Such added components consequently add weight, increase noise, increase power consumption, and add system complexity to aircraft. The addition of weight to aircraft can commensurately increase fuel consumption, decrease aircraft range, potentially decrease passenger capacity count, and otherwise increase aircraft operation cost.

Unless explicitly identified as such, no statement herein is admitted as prior art merely by its inclusion in the Technological Field and/or Background section.

SUMMARY

According to a present aspect, a system for repurposing waste heat produced from an aircraft air chilling circuit to augment galley water heating in a galley water heating appliance is disclosed, with the system including a chilled air circuit including an air chiller, and with the air chiller including an air chiller air return, and with the chilled air circuit configured to produce a chilled airflow. The system further includes a heat exchanger positioned in communication with air chiller air return, with the heat exchanger in communication with the chilled air circuit. The system further includes a potable water supply in communication with the heat exchanger, with the potable water supply configured to provide at least an initial charge of potable water flow to form a potable water flow. The system further includes a potable warmed water line in communication with and located downstream from the heat exchanger, with the potable warmed water line configured to deliver a warmed potable water flow from the heat exchanger. The system further includes an aircraft galley water heating appliance in communication with the potable warmed water flow line.

In another present aspect, a system further includes a potable warmed water holding tank in communication with the potable warmed water flow line at a point downstream from the heat exchanger.

In another present aspect, the potable water supply includes a selected ambient aircraft potable water supply temperature ranging from about 35° F. to about 77° F., and the potable warmed water flow includes an average potable warmed water flow temperature ranging from about 65° F. to about 75° F.

In another present aspect, the aircraft galley water heating appliance is at least one of an aircraft galley coffee maker and/or an aircraft galley water boiler, and an aircraft galley steam oven.

In a further present aspect, the chilled air circuit is at least indirectly in communication with the potable water circuit.

In another aspect, the potable water circuit is a potable water closed circuit, said potable water closed circuit further comprising a valve, said valve positioned between the aircraft potable water supply and the potable water circuit, and wherein said valve is configured to move from an open position to a closed position to maintain a closed initial potable water charge within the potable water closed circuit.

In another present aspect, the potable water circuit is a potable water open circuit in communication with a continuous potable water flow directed from the aircraft potable water supply into the potable water circuit, said continuous potable water flow configured to reenter the aircraft potable water supply in the potable water open circuit.

In another present aspect, the potable water circuit is in communication with galley water heating appliance via the potable warmed water flow via potable warmed waterflow line, said potable water circuit configured to provide a potable warmed water flow to the aircraft galley water heating appliance.

In another present aspect, the potable water circuit is in communication with the chilled air circuit, said potable water circuit configured to augment cooling air in the chilled air circuit.

In another present aspect, a present system further includes an aircraft galley cart compartment, wherein the potable water circuit is in direct contact with the aircraft galley cart compartment, with the aircraft galley compartment configured to further increase the temperature of the potable warmed water flow to form a potable further warmed water flow that is directed from the aircraft galley cart compartment, and wherein the potable further warmed water flow has a potable further warmed water flow temperature that is higher than a potable warmed water flow temperature.

In another present aspect, a system further includes a potable warmed water holding tank in communication with the potable warmed water flow line at a point downstream from the aircraft galley cart compartment.

In another present aspect, the chilled air circuit is further in direct contact with the aircraft galley cart compartment.

Another present aspect is directed to an aircraft including a system for repurposing waste heat from an aircraft air chilling circuit to augment galley water heating in an aircraft galley water heating appliance is disclosed, with the system including a chilled air circuit including an air chiller, and with the air chiller including an air chiller air return, and with the chilled air circuit configured to produce a chilled airflow. The system further includes a heat exchanger positioned in communication with air chiller air return, with the heat exchanger in communication with the chilled air circuit. The system further includes a potable water supply in communication with the heat exchanger, with the potable water supply configured to provide at least an initial charge of potable water flow to form a potable water flow. The system further includes a potable warmed water line in communication with and located downstream from the heat exchanger, with the potable warmed water line configured to deliver a potable warmed water flow from the heat exchanger. The system further includes an aircraft galley water heating appliance in communication with the potable warmed water flow line.

Another present aspect is directed to an aircraft including a system for repurposing waste heat from an aircraft air chilling circuit to augment galley water heating in a galley water heating appliance is disclosed, with the system including a chilled air circuit including an air chiller, and with the air chiller including an air chiller air return, and with the chilled air circuit configured to produce a chilled airflow. The system further includes a heat exchanger positioned in communication with air chiller air return, with the heat exchanger in communication with the chilled air circuit. The system further includes a potable water supply in communication with the heat exchanger, with the potable water supply configured to provide at least an initial charge of potable water flow to form a potable water flow. The system further includes a potable warmed water line in communication with and located downstream from the heat exchanger, with the potable warmed water line configured to deliver a potable warmed water flow from the heat exchanger. The system further includes an aircraft galley water heating appliance in communication with the potable warmed water flow line, with the system further including an aircraft galley cart compartment, wherein the potable water circuit is in direct contact with the aircraft galley cart compartment, with the aircraft galley compartment configured to further increase the temperature of the potable warmed water flow directed to the aircraft galley cart compartment to forma potable further warmed water flow having potable further warmed water temperature that is higher than a potable warmed water flow temperature.

Another present aspect is directed to a method for providing an at least partially pre-heated water bolus to an aircraft galley water heating appliance, with the method including directing at least an initial charge of a potable water flow from an aircraft potable water supply into an aircraft potable water circuit, with the potable water supply including a potable water supply temperature that is at a temperature below an aircraft cabin ambient temperature, said potable water circuit comprising a heat exchanger. In a present aspect, the method further includes positioning the heat exchanger in close proximity to an air chiller air return of an air chiller, said air chiller return in communication with a chilled air circuit. The method further includes warming the potable water flow at the heat exchanger to form a potable warmed water flow leaving the heat exchanger in the potable water circuit, with method further including directing the potable warmed water flow from the heat exchanger in the potable water circuit to an aircraft galley water heater of an aircraft galley water heating appliance, with the potable warmed water flow delivered to the aircraft galley water heater as a pre-heated potable water bolus.

In another present aspect, in operation, the potable water circuit comprises a potable water closed circuit.

In a further present aspect, the potable water circuit comprises a potable water open circuit, with potable water open circuit configured to remain in open communication with the aircraft potable water supply.

In another present aspect, the potable water supply maintains a selected average temperature ranging from about 35° F. to about 77° F.

In another present aspect, a method further includes directing chilled air from a chilled air circuit to an aircraft galley cart compartment, with the chilled air circuit comprising the air chiller.

In another present aspect, the method further includes directing the potable warmed water flow from the heat exchanger to an aircraft galley cart compartment, further warming the potable warmed water flow at the aircraft gally cart compartment to form a potable further warmed water flow, and directing the potable further warmed water flow in the potable water circuit from the aircraft galley cart compartment to the aircraft galley water heating appliance as the pre-heated potable water bolus.

A further present aspect is directed to an aircraft water heating appliance configured to receive the pre-heated water bolus according to a presently disclosed method.

A further present aspect is directed to an aircraft comprising an aircraft water heating appliance, said aircraft water heating appliance configured to receive the pre-heated water bolus according to a presently disclosed method.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
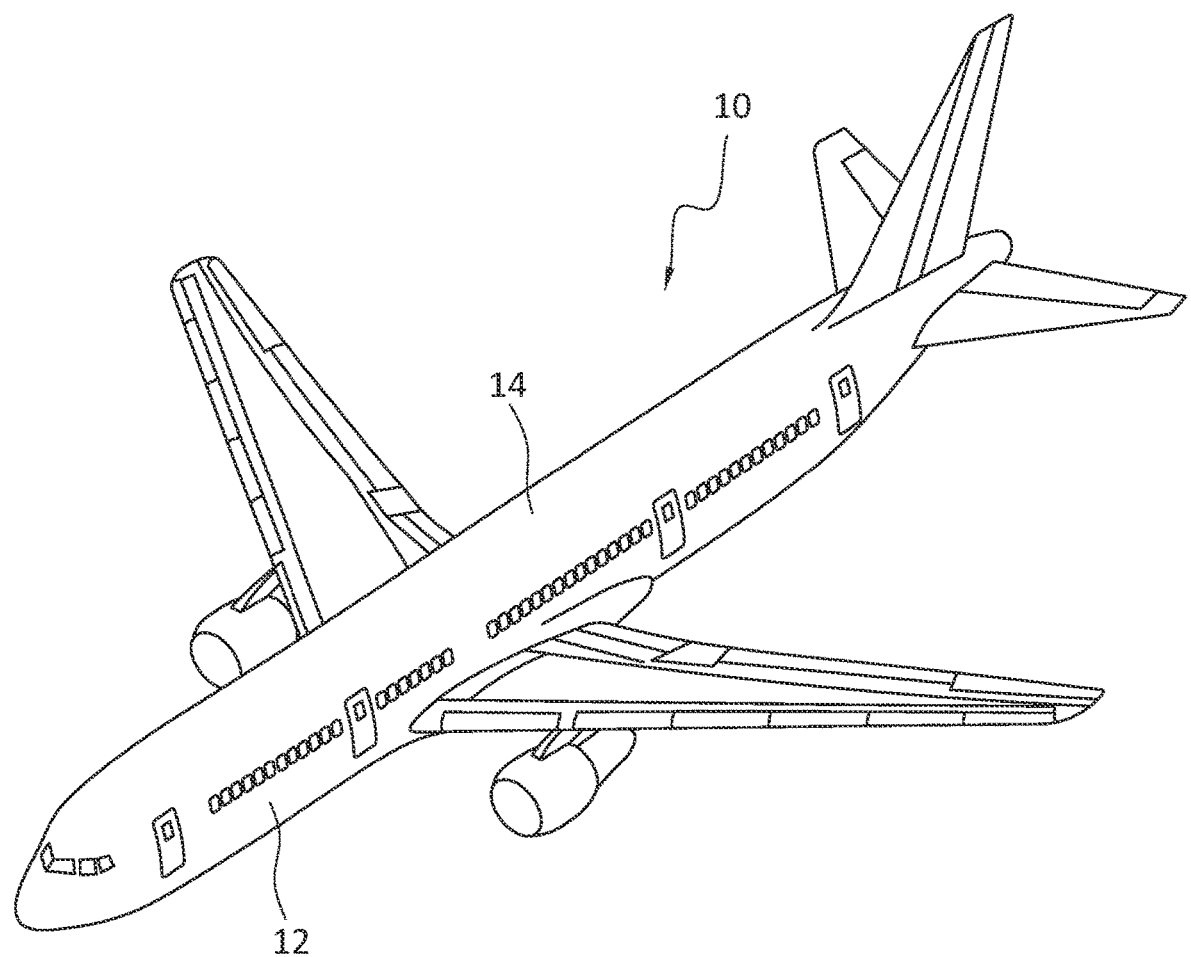
Figure 2:
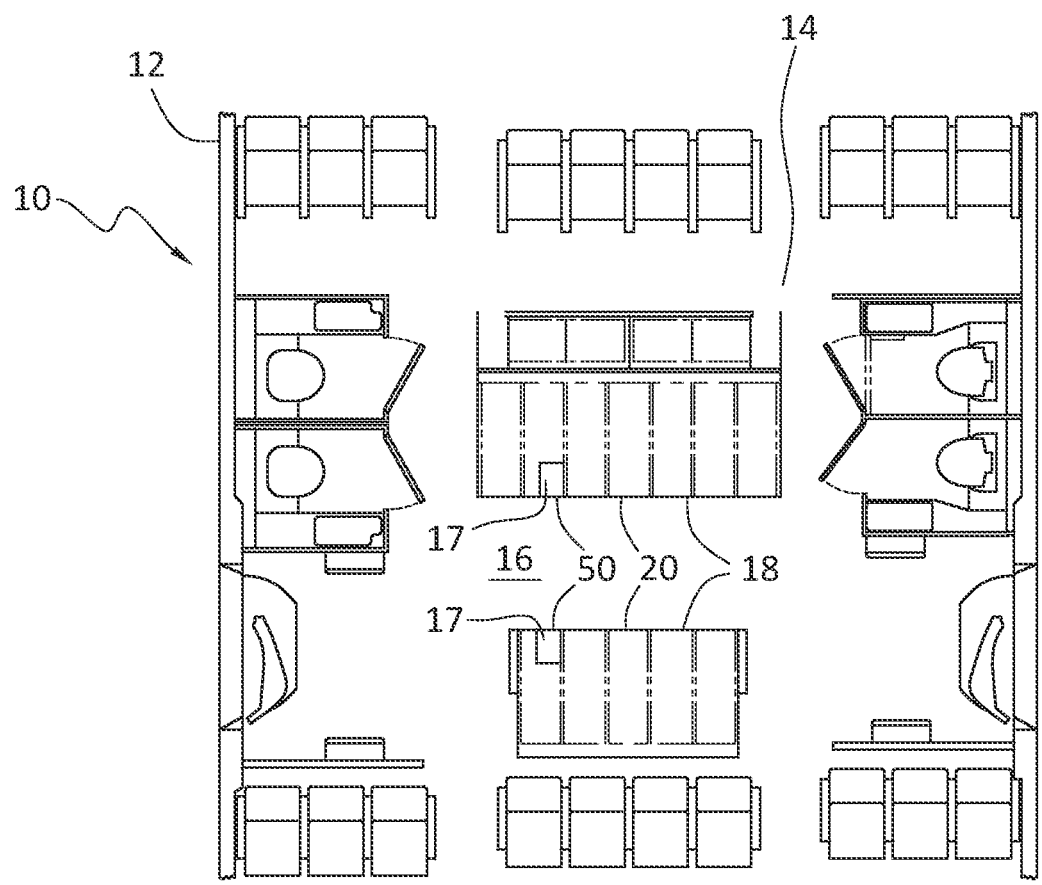
Figure 3A:
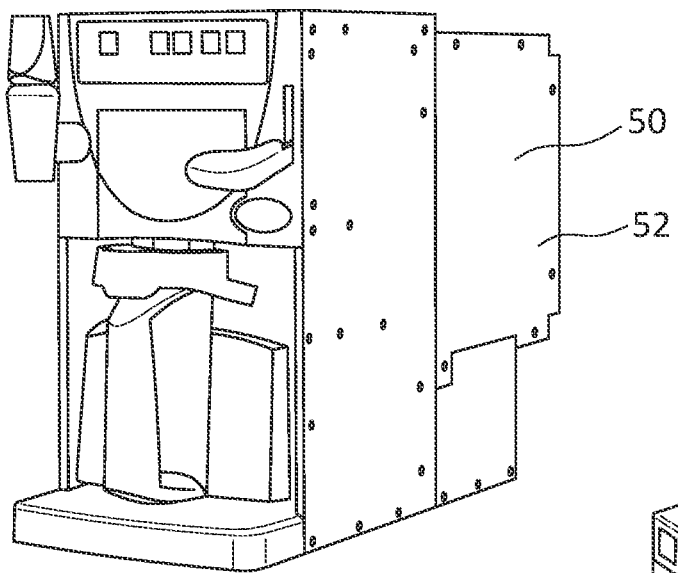
Figure 3B:
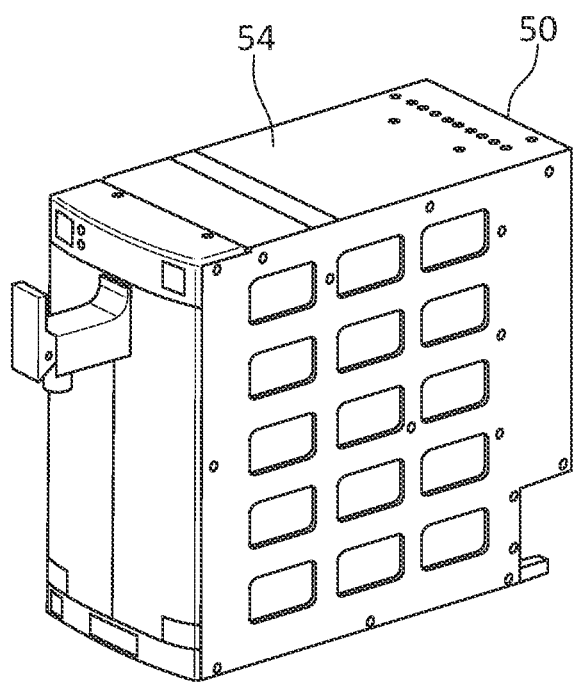
Figure 3C:
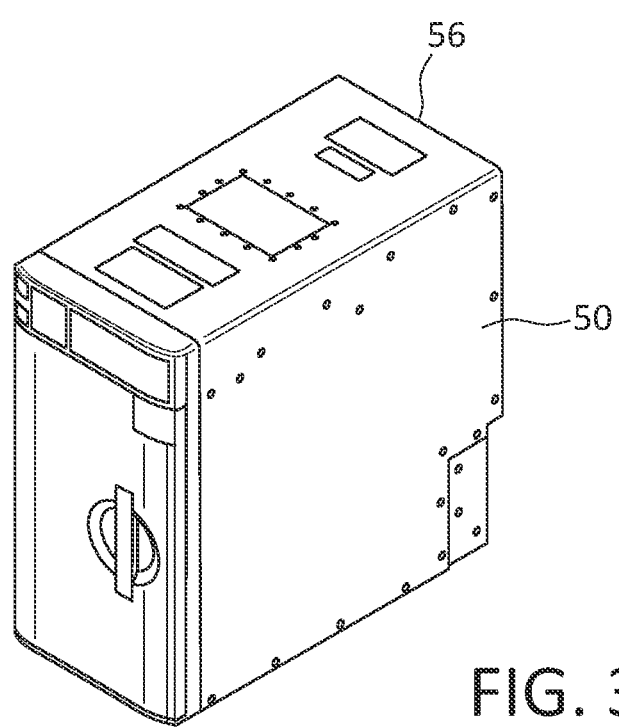
Figure 4:
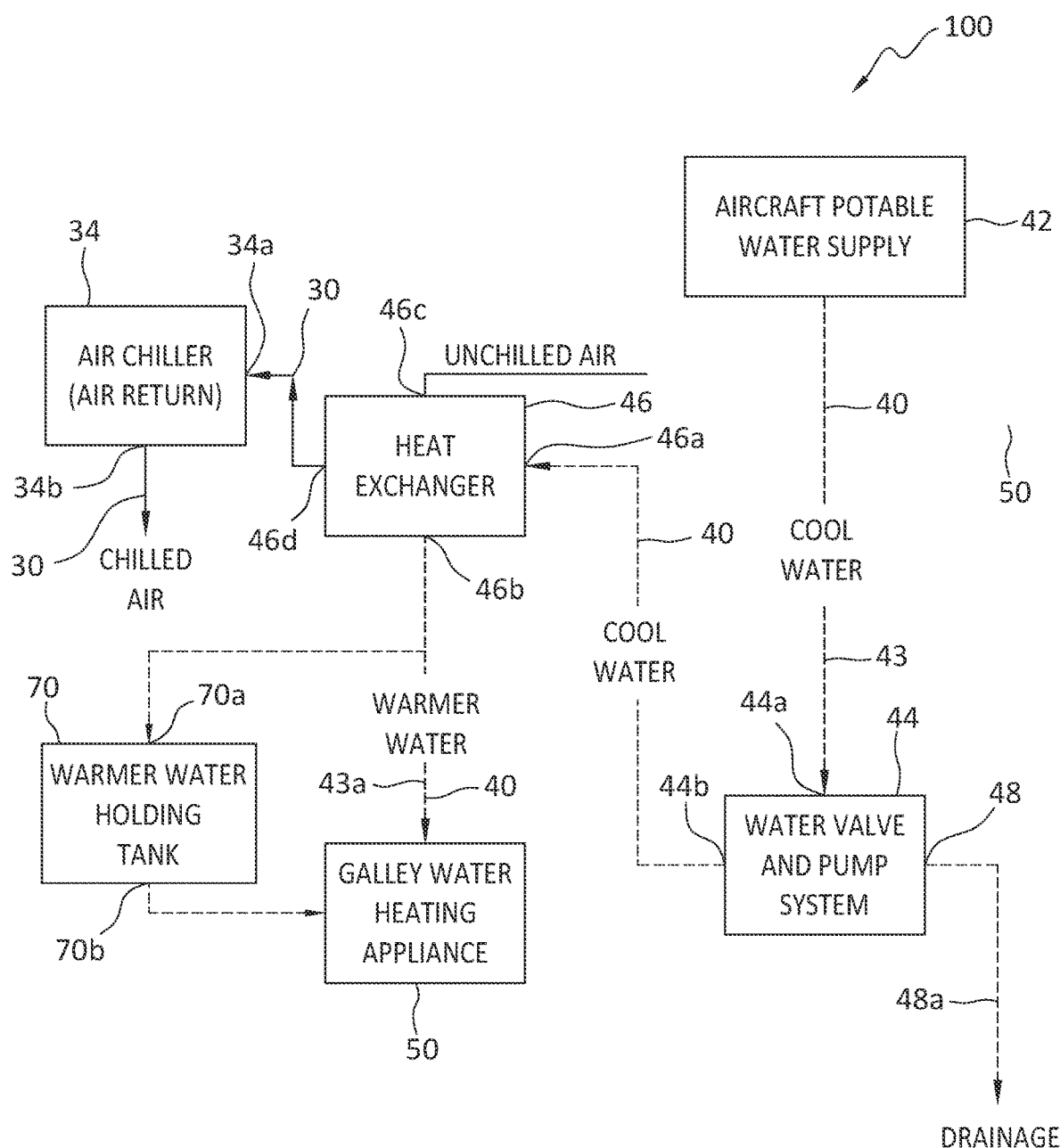
Figure 5:
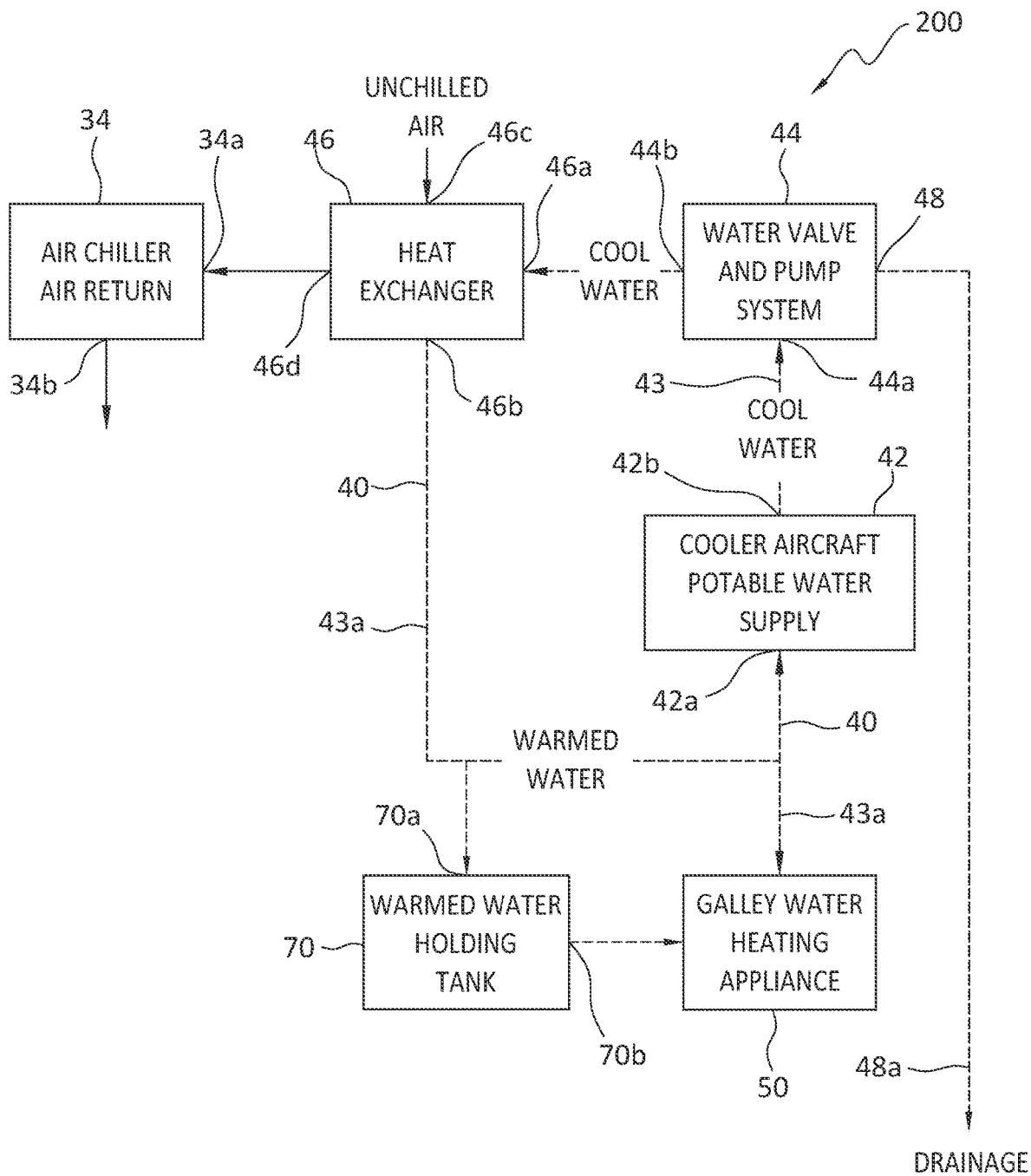
Figure 6:
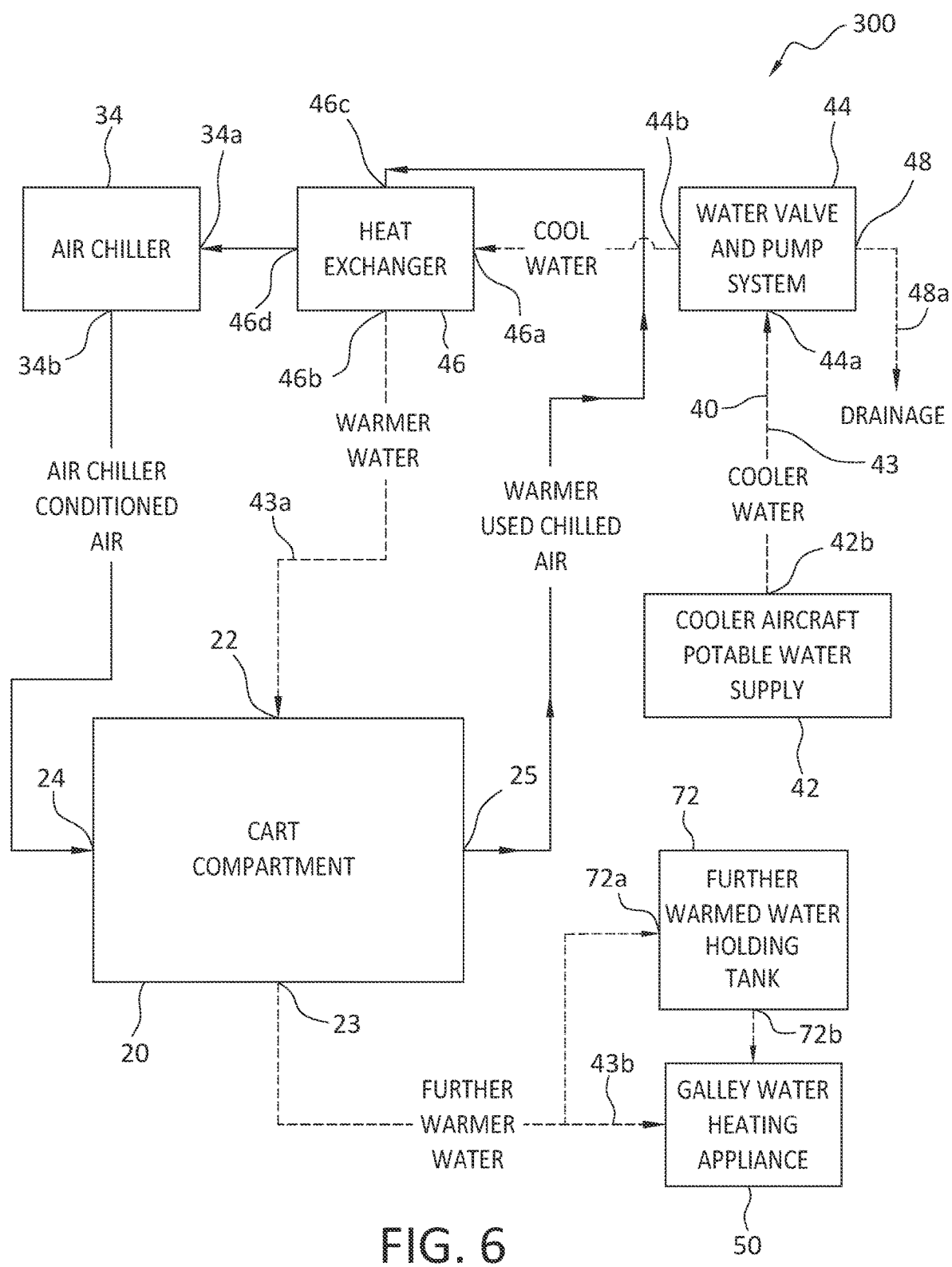
Figure 7:
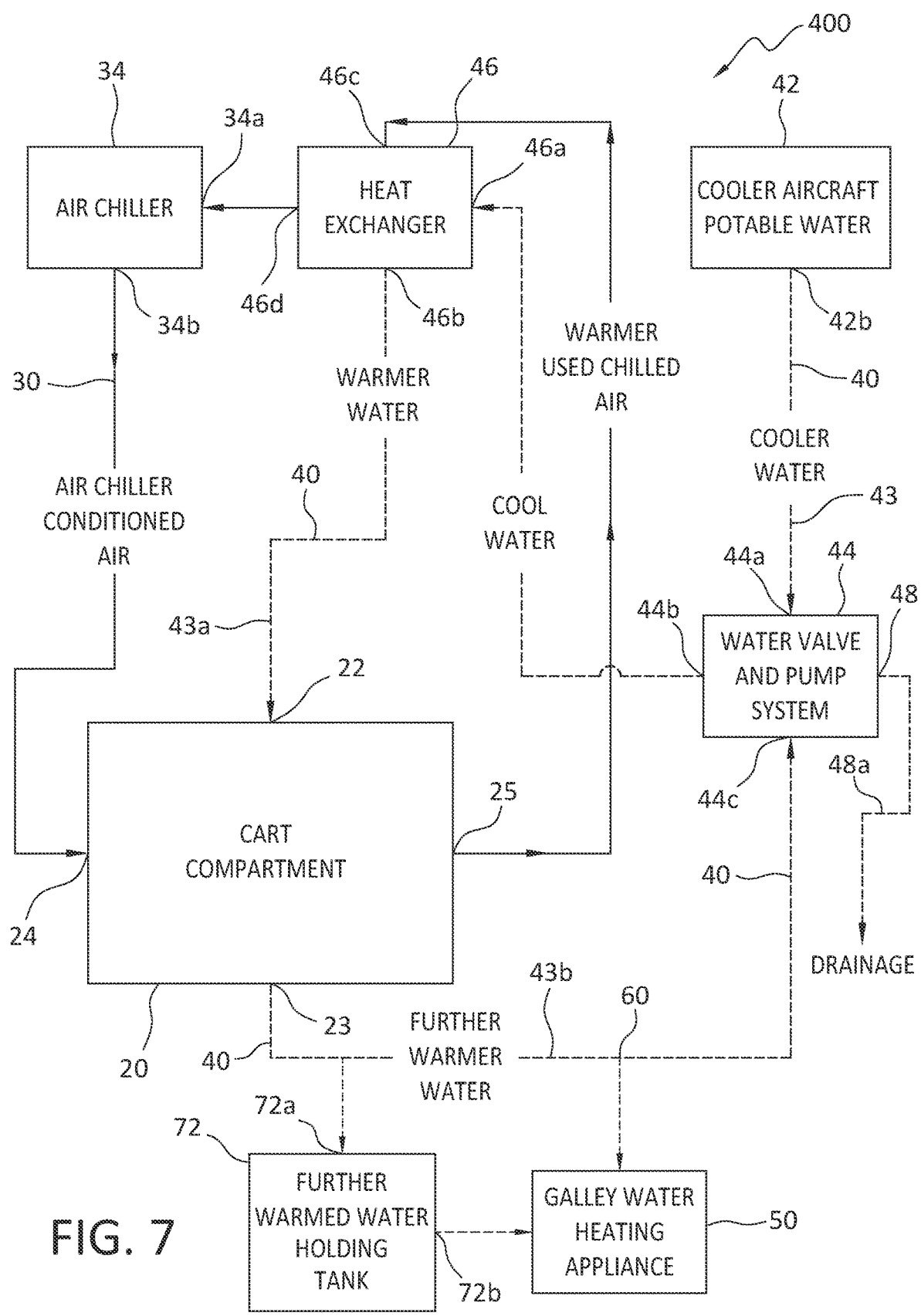
Figure 8:
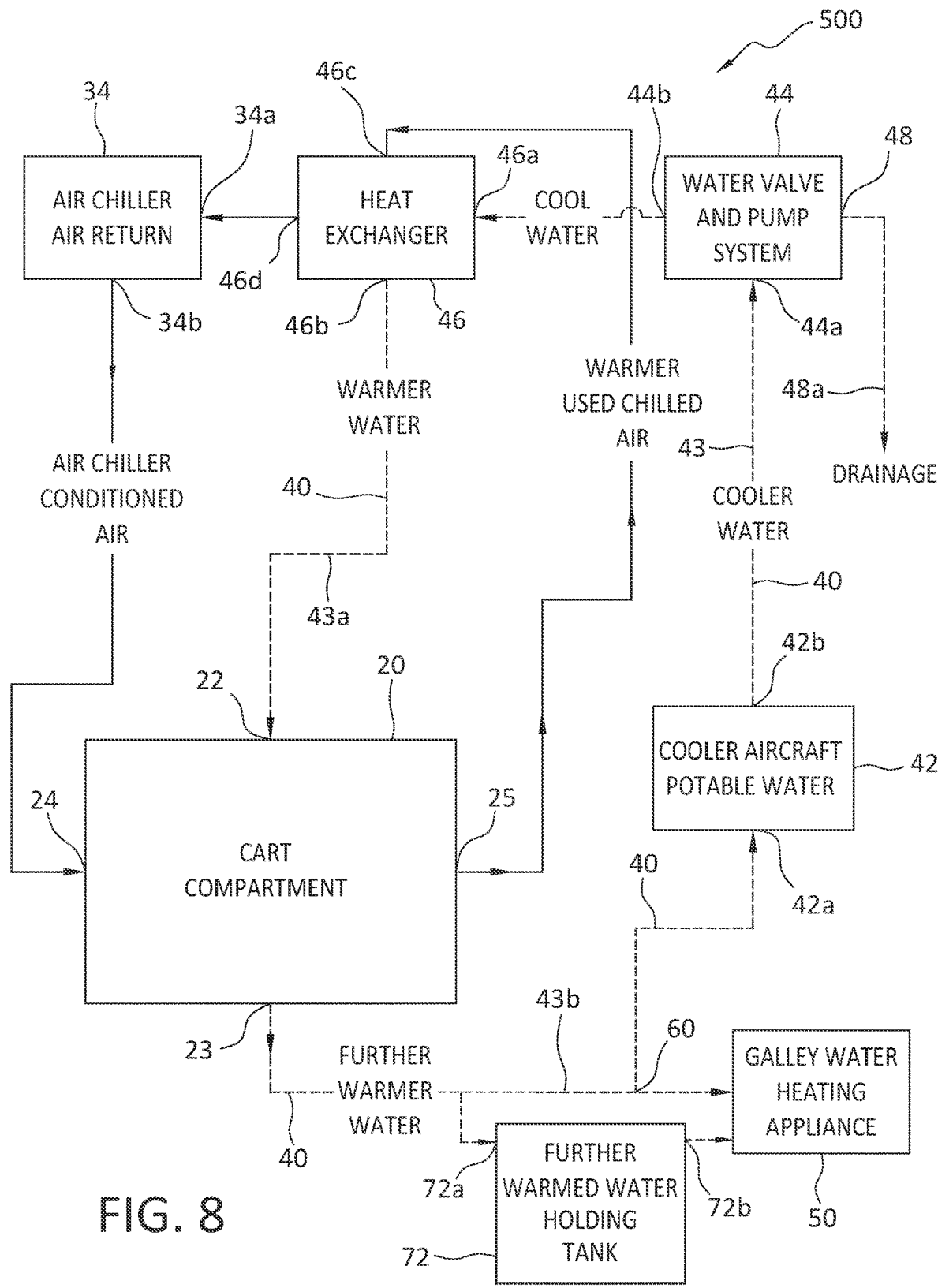
Figure 9:
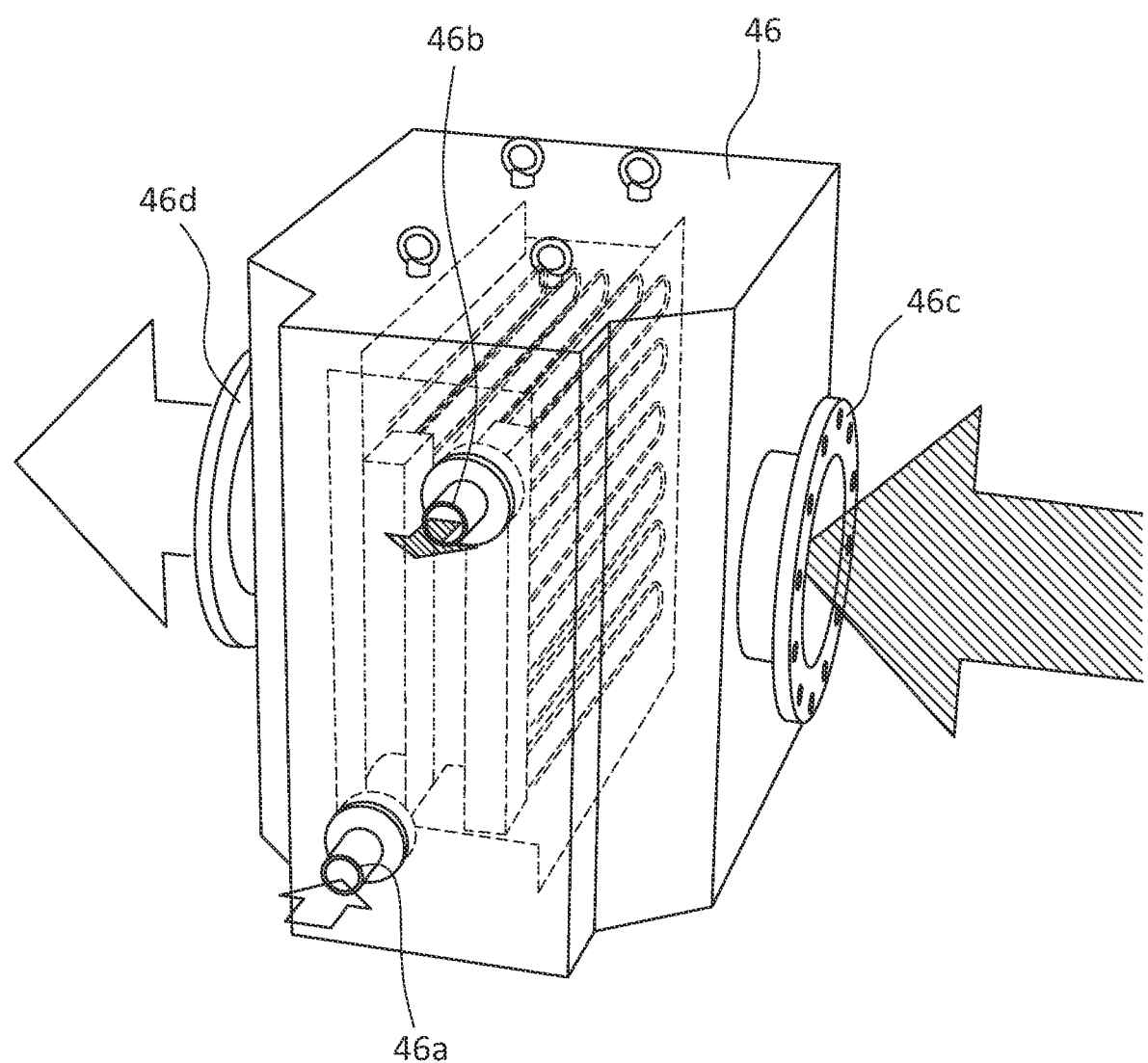
Figure 10:
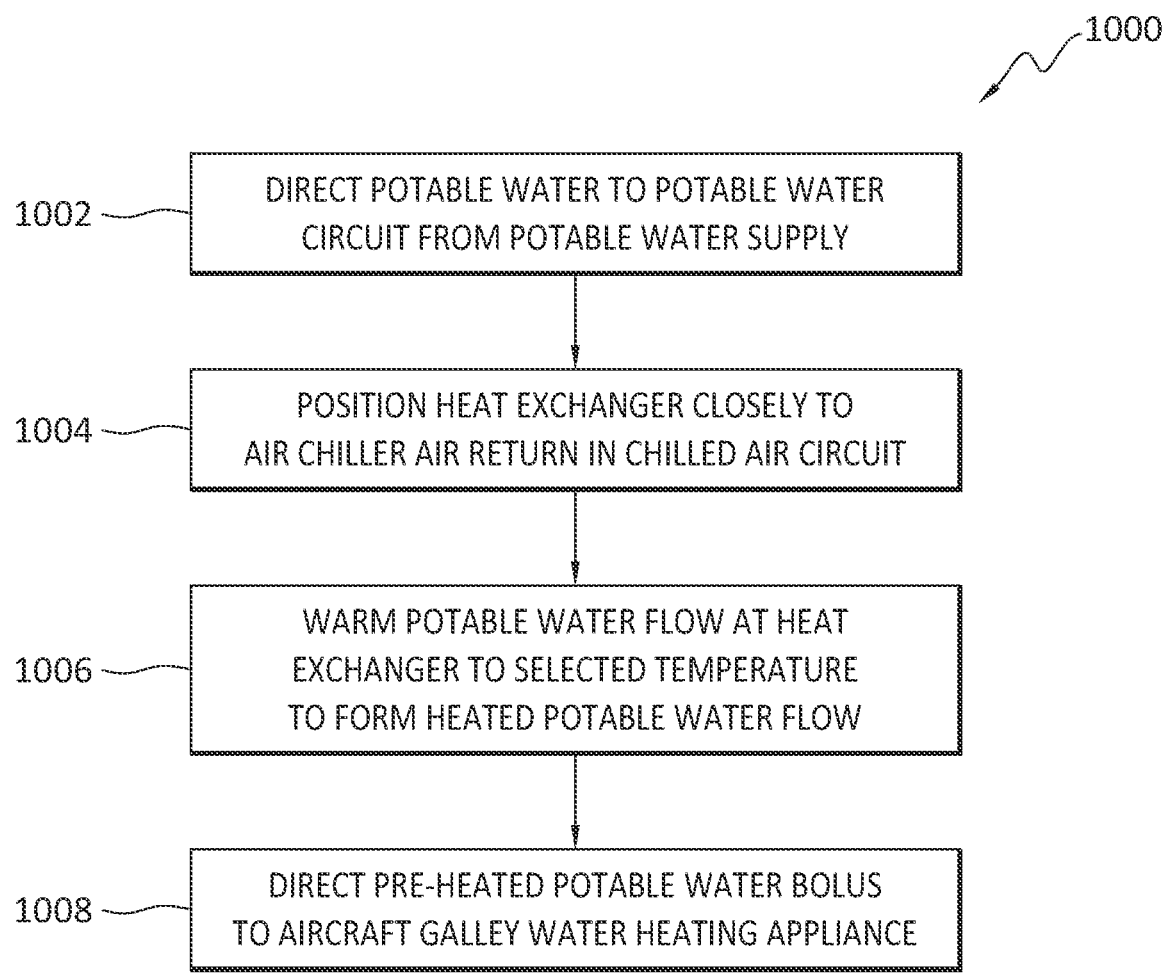
Figure 11:
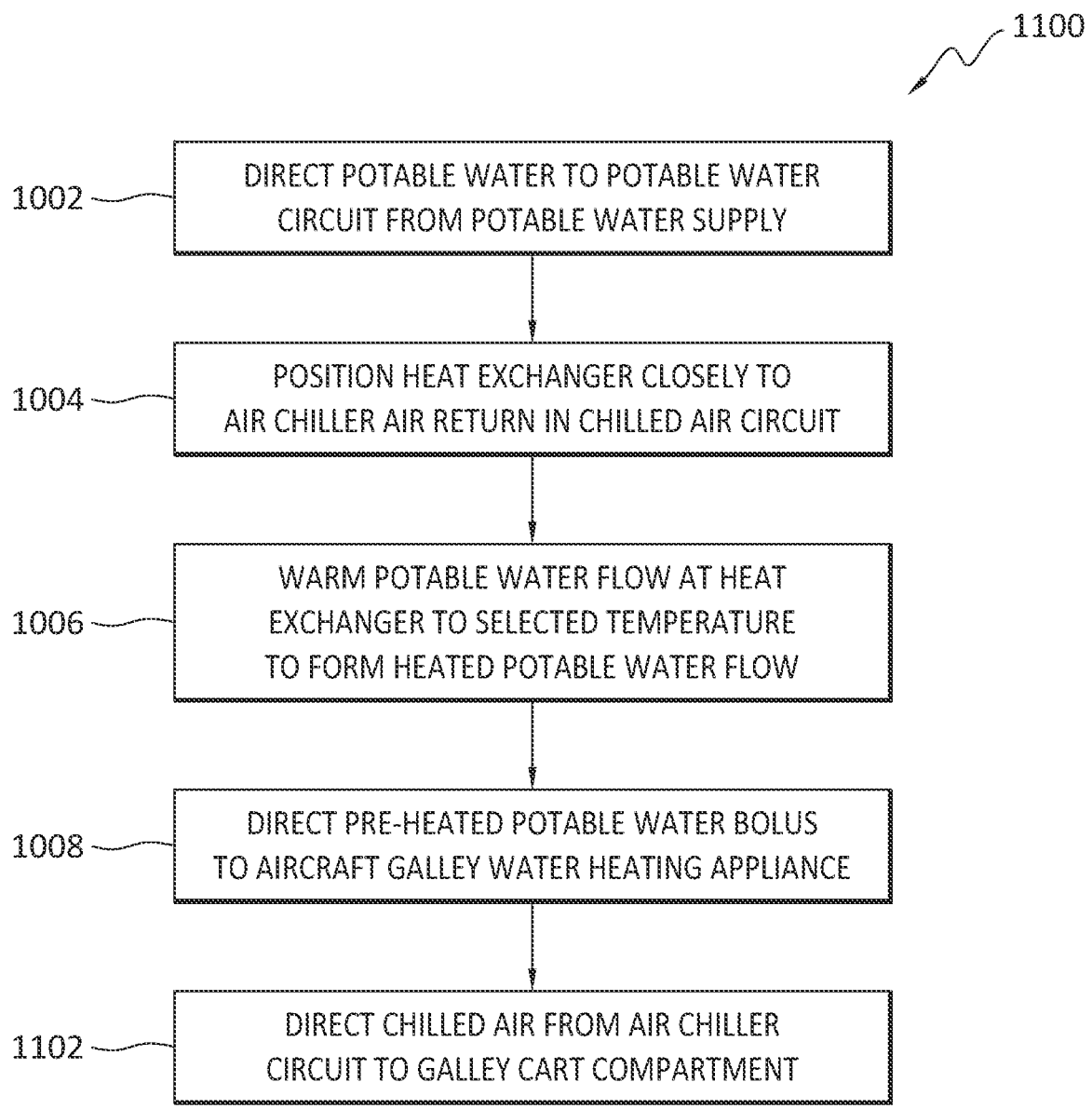
Figure 12:
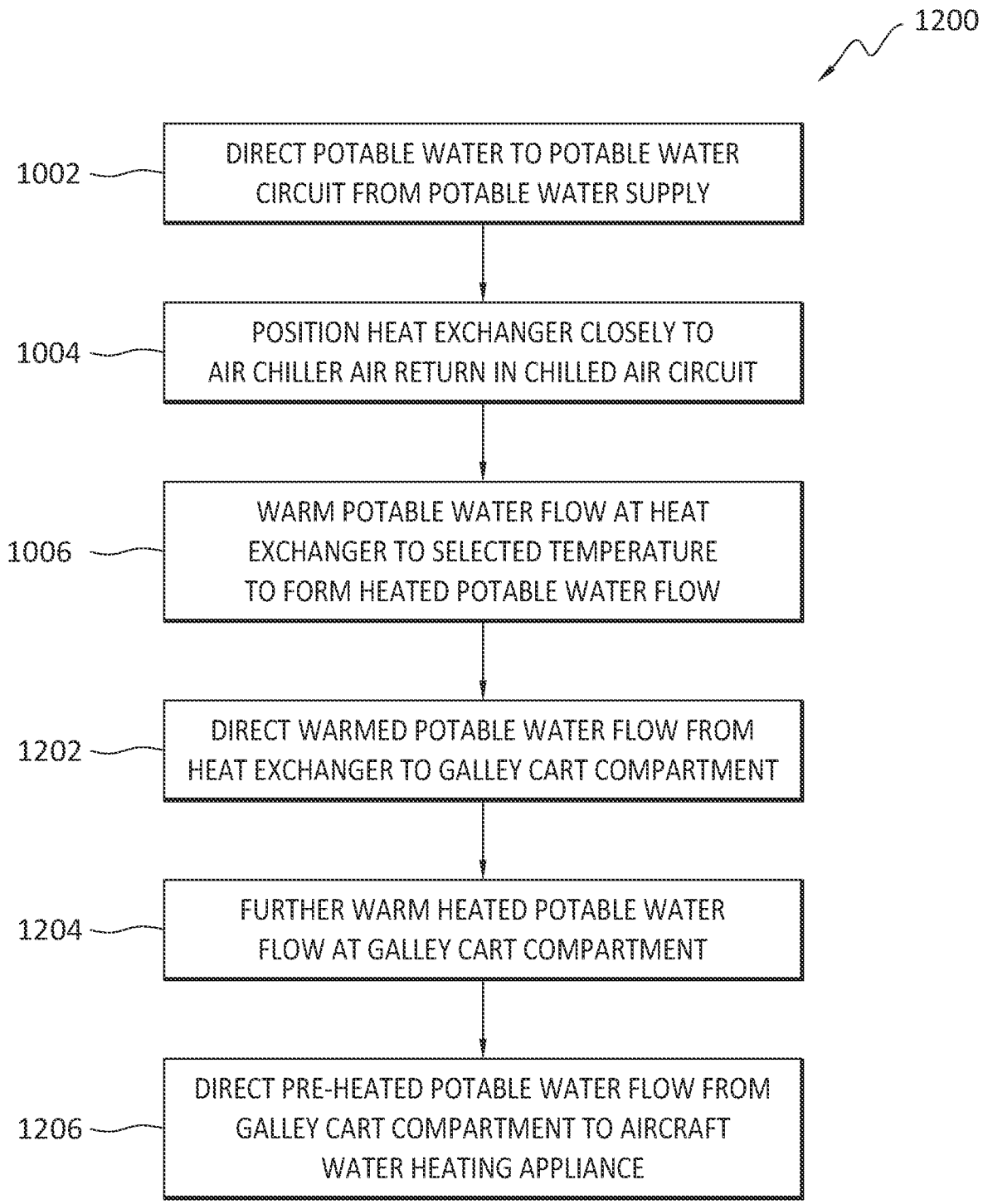

Having thus described variations of the disclosure in general terms, reference will now be made to the accompanying drawings, which are not necessarily drawn to scale, and wherein:

FIG. 1 is an illustration of a vehicle in the form of an aircraft, according to present aspects;

FIG. 2 is an overhead plan view of an aircraft cabin present in an aircraft of the type shown in FIG. 1, according to present aspects;

FIG. 3A is an aircraft water heating appliance in the form of a coffee maker (beverage maker), according to present aspects;

FIG. 3B is an aircraft water heating appliance in the form of a water boiler (beverage maker), according to present aspects;

FIG. 3C is an aircraft water heating appliance in the form of a steam oven, according to present aspects;

FIG. 4 is a box diagram of a system 100, according to present aspects;

FIG. 5 is a box diagram of a system 200, according to present aspects;

FIG. 6 is a box diagram of a system 300, according to present aspects;

FIG. 7 is a box diagram of a system 400, according to present aspects;

FIG. 8 is a box diagram of a system 500, according to present aspects;

FIG. 9 is a partially exposed cross-sectional view of a heat exchanger;

FIG. 10 is a flowchart outlining a method (1000), according to present aspects;

FIG. 11 is a flowchart outlining a method (1100), according to present aspects; and FIG. 12 is a flowchart outlining a method (1200), according to present aspects.

DETAILED DESCRIPTION

Passenger aircraft typically use potable water directed from a potable water supply for multiple passenger and crew uses including, for example, lavatory needs (that can include toilet operation, hand washing, etc.), crew needs, for example, in a galley location, and other uses. Potable water is typically maintained within one or more potable water tanks typically stored in a cargo or equipment bay located beneath a passenger cabin floor, with the potable water tanks typically residing in an area of the aircraft that is typically subjected to cold temperatures when an aircraft is in a flight phase and flying at altitudes with cold temperatures located outside the aircraft.

Potable water tanks on aircraft (referred to equivalently herein as "an aircraft potable water supply") can include an intake and discharge port that can be the same port capable of providing intake function for filling the potable water tank(s), and a discharge function for depleting/draining the potable water tank(s). A potable water tank can be charged/filled when the aircraft is on the ground from a ground potable water supply that can be a direct ground water supply from a ground-based tank that is pumped into the aircraft potable water tank(s). In addition, a ground potable water tanker-type vehicle can transfer potable water, for example, from a ground water tank, into the aircraft potable water tank(s). In both instances, the potable water that is transferred into aircraft potable water tank(s) is typically delivered at a below-ambient temperature such that the potable water is in a "cooled temperature" ranging from about 35° F. to about 77° F.

Potable water temperature can increase in within the aircraft potable water tank(s) when an aircraft is on the ground (e.g., if the ambient outdoor temperature is warm with temperatures ranging from about 80° F. or more). However, once an aircraft is airborne and reaches an altitude, for example, in excess of about 10,000 feet, the ambient temperature outside of the aircraft during flight can reach cold ambient outdoor temperatures ranging from about minus 20° F. to about 0° F., etc. Accordingly, potable water typically enters an aircraft (e.g., is delivered from an exterior potable water source into an aircraft, etc.) at below ambient temperatures and, due to the location of potable water tanks on aircraft "below-deck" (e.g., in aircraft equipment and cargo bays that are not typically heated, etc.), an aircraft potable water supply in aircraft potable water tank(s) is typically directed from an aircraft potable water supply, in flight, to aircraft cabins at "cool" temperatures ranging from about 40° F. to 50° F.

In another example, an aircraft potable water supply in the form of a "tank" can be located in other aircraft locations also typically not heated including, for example, in an aircraft crown (e.g., located above an aircraft passenger cabin ceiling, etc.). In another example, an aircraft can comprise multiple potable water tanks located at the same or differing aircraft locations or regions (e.g., one or more potable water tanks located "below-deck" as well as one or more tanks located in the aircraft crown, etc.).

According to present aspects, potable water sources (e.g., a water supply in a vessel that can be a water tank, etc.) on an aircraft represent a source of cool material flow that presents a thermal (e.g., temperature) delta between the potable water flow from a potable water supply temperature and points along a potable water flow circuit directed from a potable water supply in a in a potable water circuit. That is, according to present aspects, a potable water flow in an aircraft can be configured to absorb heat during a thermal exchange occurring between a potable water flow "cooler" temperature and a higher ambient temperature that the potable water flow encounters in the potable water circuit after leaving the potable water supply, and that can be, for example, components of a chilling air circuit including a heat exchanger, as well as monuments within an aircraft passenger cabin including, for example, a galley cart compartment.

According to further present aspects, a potable water flow that has an initial water temperature that is below the ambient temperature of an aircraft passenger cabin can provide "cooling" to augment a chilled air circuit, with the "boosted" chilled air then directed to provide a cooling function in the passenger cabin and/or to provide a direct cooling function to a galley cart compartment (e.g., to maintain the temperature within a galley cart compartment ranging from about 32° F. to about 45° F.).

According to present aspects, the potable water flow is placed into contact with a chilled air circuit at a heat exchanger where the potable water flow in the potable water circuit in an aircraft is configured to absorb heat from the chilled air circuit as well as from ambient air in a passenger cabin that is warmer than the temperature of the potable water flow. A thermal exchange increases the temperature of the potable water flow while decreasing the temperature of the air in the chilled air. In addition, as "spent" cool air begins to warm in the chilled air circuit and this "waste heat" from the chilled air circuit is brought into contact with the potable water circuit (e.g., at a heat exchanger) with the "waste heat" transferred into the potable water flow in the potable water circuit. The temperature of the potable water circuit that "absorbs this "waste heat" can increase the temperature of potable water flow in the potable water circuit from an ambient potable water supply temperature that can (at least during aircraft flight) range from 32° F.-45° F. to a warmer average temperature of a potable warmed water flow ranging from about 65° F. to about 77° F.

Present aspects are directed to the efficient redirection, re-purposing, modification, and augmentation of waste heat into a potable water flow of potable water from potable water systems already present in an aircraft into a new potable water circuit for at least one intended purpose of providing a pre-heated potable water flow to an aircraft hot water appliance that can be in the form of a at least one of beverage maker (e.g., a coffee maker and/or a water boiler), and/or a steam oven.

According to present aspects, the advantageous use of the thermal delta of the aircraft potable water supply to transfer absorbed waste heat (e.g., waste heat from a chilled air circuit via a heat exchanger in close proximity to an air chiller air return) can significantly decrease existing aircraft water heating appliance energy demand (e.g., power draw), including, for example, decreasing overall aircraft power consumption, obviating or reducing the size of water heating apparatuses in water-heating appliances, reducing the footprint, size characteristics, and reducing power consumption demands of such heating units etc. The reduction heating appliance power demands and the reduced overall aircraft power consumption demands (e.g., from batteries, APUs, etc.) can result in a significant reduction in the overall weight of an aircraft, resulting in significant decreases operating cost, and a significant increase in efficiency that can result in the increase in sustainability and decrease in an environmental footprint of an aircraft.

In addition, the potable water supply cooling function that can in concurrently "cool" an air flow and augment the cooling of air supplied to an air chiller can occur substantially concurrently while other regions of the potable water circuit can provide and be in communication with the "pre-warmed" and/or "pre-heated" potable water flow out from the potable water circuit (referred to equivalently herein as a "potable warmed water flow") to a heating function of an aircraft water heating appliance. With respect to the concurrent indirect "cooling" function, present aspects obviate the need to install and power separate equipment, components, and systems onto aircraft that perform the dedicated and primary function of refrigerating food cart contents in an aircraft, for example. In addition, present aspects employ a safe, modified augmented cooling of a chilled air circuit cooling system that will cool and/or chill aircraft food cart/galley cart contents, etc., to produce enhanced cooling of aircraft food cart/galley cart and galley cart compartment contents, etc., with present systems obviating cooling systems that can employ ammonia or other potentially toxic compounds.

FIG. 1 is a perspective view of a vehicle in the form of an aircraft 10 including a fuselage 12, and containing and otherwise including an aircraft cabin 14 within fuselage 12. FIG. 2 is an overhead plan view of the aircraft cabin 14 within an aircraft of the type shown in FIG. 1 as aircraft 10. As shown in FIG. 2, a galley region 16 can include one or more aircraft galley hot water heaters (that can be integral with, for example, a hot water heating appliance) one or more galley carts 18, one or more galley cart compartments 20 located within galley region 16.

Present aspects are directed the redirection and recapture of "waste heat" from a chilled air circuit using the potable water flow as a heating medium in a potable water circuit that is directed from the potable water circuit to an aircraft galley water-heating appliance, while the chilled air circuit concurrently enhances direct cooling of galley cart compartments on aircraft through the direction of chilled air from a chilled air circuit, directly, to a galley cart compartment. Present aspects also contemplate the use of the potable water circuit to indirectly enhance and/or augment galley cart compartment cooling by directly augmenting the cooling (e.g., the "pre-cooling") of the air entering a chilled air return of an air chiller in the chilled air circuit.

According to present aspects, a potable water circuit is established and configured within an aircraft, with the potable water circuit in communication with a cool aircraft potable water supply and/or further in communication with existing potable water circuits in aircraft. In one present aspect, a system for cooling an aircraft galley cart compartment includes directing a potable water flow within a potable water circuit in communication with a cool potable water supply. The potable water circuit is configured to transfer the cooling capability of the cool potable water flow directly, or indirectly, to a galley cart compartment. As defined herein, a "cool" aircraft potable water supply and a "cool" potable water flow refers to a temperature of the aircraft water supply and the potable water flow being at least cooler than an ambient temperature of an aircraft cabin when the aircraft is on the ground in a hot environment, and significantly cooler than an aircraft cabin ambient temperature when the aircraft is in flight and at a sustained altitude of greater than about 10,000 feet, for example.

According to present aspects, the cooling transfer can be transferred indirectly to the galley cart compartment with the cool potable water flow interacting with an airflow to chill or to further chill air in the airflow that is then directed to the aircraft galley cart compartment. In this aspect, the cooling effect of the potable water flow in the potable water circuit can interface with an airflow at, and via, a heat exchanger to cool or chill the airflow that is then directed from the heat exchanger to the galley cart compartment. According to present aspects, the airflow chilled by the potable water flow within the potable water circuit can further be in communication with an auxiliary air cooler or air chiller, with the size and/or footprint of the auxiliary air chiller able to be significantly reduced compared with air chillers that were previously used.

FIGS. 3A, 3B, and 3C are illustrations of non-exhaustive representations of an aircraft water heating appliance 50 (referred to equivalently herein as an "aircraft galley water heating appliance):that employ a flow of potable water to be heated by the appliance. FIG. 3A illustrates an aircraft beverage maker in the form of a coffee maker 52. FIG. 3B illustrates an aircraft beverage maker in the form of a water boiler 54 (also referred to herein as a "hot water heater" 52). FIG. 3C illustrates a steam oven 56 that can be placed in communication with present systems. The aircraft water heating appliance 50 can comprise an integral or otherwise integrated water heating apparatus, with the water heating appliance 50 further in communication with a potable warmed water flow (referred to equivalently herein as a "potable preheated water flow" and/or a "potable heated water flow" that is directed to the water heating appliance from a potable water source (referred to equivalently herein as a "potable water supply"), not shown in FIGS. 3A, 3B, 3C.

According to present aspects, a potable water flow is "warmed" by the potable water flow absorbing amounts of waste heat from the chilled air circuit at a heat exchanger to form a potable warmed water flow, and with the potable warmed water flow directed to the water heating appliance via a warmed water line that extends from and that is otherwise in communication with a potable water circuit. The warmed water line is configured to deliver potable warmed water (referred to equivalently herein as "pre-heated potable water") via a potable warmed water line (referred to equivalently herein as "pre-heated potable water line"), with the "pre-heated" potable water line in communication with a potable water circuit and with the "pre-heated" potable water line further in communication with the water heating appliance.

FIGS. 4, 5, 6, 7, and 8 are illustrations outlining systems, according to present aspects, for delivering, on demand, cool potable water into a cool water circuit line 43 from a cool potable water supply 42 that can be maintained at a temperature that can be cooler than the ambient temperature within an aircraft passenger cabin, for example. Potable water is released, on demand, from a potable water supply and is directed into and out from a heat exchanger placed in close proximity to an air flow, such that an air flow enters and exits the heat exchanger and the potable water flow in the potable water circuit enter and exits the heat exchanger.

Thermal energy is absorbed from the airflow (e.g., air circuit) by the potable water flow in the heat exchanger with the resultant air flow exiting the heat exchanger being cooler than the incoming air flow (into the heat exchanger), and with the potable water flow exiting the heat exchanger being warmer than the temperature of the cool potable water flow entering the heat exchanger. In this way, according to system 100, waste heat from air flow is captured by the potable water flow, with the now warmer potable water flow directed, as needed, and directed from the heat exchanger as a "pre-warmed" potable water flow (e.g., as a potable warmed water flow), to an aircraft galley water heating appliance. As shown in FIGS. 4, 5, 6, 7, 8, the air circuit (the air circuit in which an airflow that can be an ambient temperature airflow and that is "conditioned" into a chilled air flow in a chilled air circuit) is shown in a "solid" line. In addition, in FIGS. 4, 5, 6, 7, 8, the potable water circuit is shown as a "dashed" line.

As shown in FIG. 4, in operation, system 100 shows a segment of a chilled air circuit 30 where ambient air (e.g., air present in a passenger aircraft) is directed in the form of an air flow into a heat exchanger 46 at heat exchanger air circuit inlet 46c and out from heat exchanger air circuit outlet 46d. Cool water that can be maintained, in flight, at a temperature that is lower than an ambient temperature in an aircraft passenger cabin (and that is therefore "cool" water) is directed from the aircraft potable water supply outlet 42b of aircraft potable water supply 42 to a cool potable water circuit line 43 and onto pump inlet 44a of pump 44. The pump 44 can comprise suitable valving to open, on demand and/or otherwise respond as directed in response to a signal from, for example, a controller, for the purpose of directing pumped water from pump 44 at pump outlet 44b and onto heat exchanger potable water inlet 46a of heat exchanger 46. At heat exchanger 46, the cooler water having a temperature lower than air entering the heat exchanger absorbs heat from the warmer air, with the result being the cooling of the air and the warming of the potable water flow within the heat exchanger.

That is, as shown in FIG. 4, in system 100, a potable water flow exits the heat exchanger as a potable warmed water flow within a potable warmed water line 43a that is now at a higher (e.g., elevated and/or "warmer") temperature than the cooler temperature of the potable water flow arriving at the heat exchanger. According to present aspects, the potable water "circuit" 40 refers to a "circuit" that, in certain present systems, my not be a complete, recirculating "circuit", and instead potable water "circuit" 40 is defined herein as being a term that connotes, otherwise refers to, and that can be either a recirculating circuit and that can also be a potable water flow path that may not be a completed and/or recirculating "circuit".

The air flow exiting the heat exchanger in the chilled air circuit 30 has an air temperature that is lower than the temperature of the air entering the heat exchanger. Accordingly, the air exiting the heat exchanger can be referred to as "pre-chilled" air that is then directed along and/or within the chilled air circuit 30 to the air chiller inlet 34a of air chiller 34. The air flow is further chilled in the air chiller 34 and exits at the air chiller outlet 34b, where chilled air circuit can further direct the chilled air to a cooling use or function (not shown in FIG. 4).

As shown in FIG. 4, the potable warmed water exiting the heat exchanger 46 and that is delivered into the potable warmed water line 43a can have a heat exchanger exit temperature (e.g., a potable warmed water flow temperature) ranging from about 65° F. to about 77° F. (and that is significantly warmer than the temperature of the "cool" potable water flow that exits the potable water supply 42 and enters the heat exchanger 46 at heat exchanger potable water inlet 46a. The stored potable water supply 42 can have a stored potable water temperature in the potable water supply ranging from about 32° F. to about 45° F. when an aircraft is flying at an altitude above about 10,000 feet, for example, and depending upon selected factors including, for example, water supply insulation, aircraft insulation, etc.). As explained herein, at heat exchanger 46, the cooler potable water flow having a temperature lower than air entering the heat exchanger absorbs heat from the warmer air entering the heat exchanger, with the result being the cooling of the air and the warming of the water flow within the heat exchanger. That is, as shown in FIG. 4, in system 100, potable water flow exits the heat exchanger potable water outlet 46b as a potable warmed water flow that is now at a higher temperature that the temperature of the "cooler" potable water flow arriving at and introduced into, the heat exchanger from the potable water supply.

According to system 100, the warmed potable water flow is directed from the heat exchanger and proceeds from the heat exchanger via the potable warmed water line 43a to a water heating appliance as a "pre-warmed" potable water flow that can then be heated further at and within the water heating appliance 50 to a selected temperature ranging from about 180° F. to about 205° F. for hot beverages and other hot water uses, and that can be heated to a higher temperature in a water heater appliance configured to generate steam such as, for example, a steam over where a selected temperature can approach 212° F.

FIG. 5 shows an "open" system 200, according to present aspects where the chilled air circuit 30 operates similarly that described for system 100 (shown in FIG. 4) In system 200, shown in FIG. 5 a potable water flow circuit 40 is established to deliver an as needed supply of cool potable from a cool potable water supply 42. That is, unlike system 100, system 200 shows water delivered into the cool potable water circuit line 43 of potable water circuit 40 from potable water supply 42, with the cool potable water circuit line 43 directed from the aircraft potable water supply outlet 42b of aircraft potable water supply 42 to a pump inlet 44a of pump 44. The pump 44 can comprise suitable valving to open, on demand and/or otherwise respond as directed in response to a signal from, for example, a controller, for the purpose of directing pumped water from the potable water supply into pump inlet 44a and out from pump 44 via pump outlet 44b, and then along potable water circuit 40 and into heat exchanger 46 at heat exchanger potable water inlet 46a of heat exchanger 46.

FIGS. 5, 7, and 8, illustrate present aspects and show present systems where a chilled air circuit and a cool potable water circuit are present, and with the potable water circuit 40 configured to augment the cooling or "chilling" of an airflow in the air circuit at a heat exchanger to pre-chill the airflow before the "pre-chilled" airflow in the air circuit enters the air return of an air chiller for further air chilling to a selected chilled air temperature.

As shown in FIG. 5, system 200 further illustrates a system where, at heat exchanger 46, the cooler potable water flow having a temperature lower than air entering the heat exchanger absorbs heat from the warmer air, with the result being the cooling of the air and the warming of the water flow within the heat exchanger. That is, (as also shown in system 100 of FIG. 4), in system 200, a potable warmed water flow exits the heat exchanger at a higher potable water flow temperature that the temperature of the potable water flow arriving at the heat exchanger.

The air flow exiting the heat exchanger has an air temperature that is lower than the temperature of the air entering the heat exchanger. Accordingly, the air exiting the heat exchanger can be referred to as "pre-chilled" air that is then directed along and/or within the chilled air circuit 30 to the air chiller inlet 34a of air chiller 34. The air flow is further chilled in the air chiller 34 and exits at the air chiller outlet 34b, where chilled air circuit can further direct the chilled air to a cooling use or function (not shown in FIG. 5).

As shown in FIG. 5, the "warmed" potable water exiting the heat exchanger 46 and entering the potable warmed water line 43a can have a heat exchanger exit temperature ranging from about 65° F. to about 77° F. (and that is significantly warmer than the temperature of the cooler potable water exiting the potable water supply 42 and that enters the heat exchanger 46 at heat exchanger potable water inlet 46a. The stored potable water supply 42 can have a stored potable water temperature in the potable water supply ranging from about 32° F. to about 45° F. when an aircraft is flying at an altitude above about 10,000 feet, for example, and depending upon selected factors including, for example, water supply insulation, aircraft insulation, etc.).

As explained herein, at heat exchanger 46, the cooler potable water flow (having a temperature lower than the air entering the heat exchanger) absorbs heat from the warmer air entering the heat exchanger, with the result being the cooling of the air and the warming of the water flow within the heat exchanger. That is, as shown in FIG. 5, in system 200, a warmed potable water flow exits the heat exchanger potable water outlet 46b and enters the potable warmed water line 43a at a higher temperature than the temperature of the cooler potable water flow arriving at and introduced into the heat exchanger from the potable water supply.

According to system 200 a portion of the warmed potable water flow can be directed, as needed, and on demand, from the heat exchanger and out of the potable warmed water line 43a of potable water circuit 40 and directed into a water heating appliance 50 as a "pre-warmed" potable water flow that can then be heated at and within the water heating appliance 50 to a selected temperature ranging from about 180° F. to about 205° F. for beverages and hot water uses, and to a higher temperature in a water heater appliance configured to generate steam such as, for example, a steam over where a selected temperature can approach 212° F. As also shown in FIG. 5, system 200 is configured to establish an "open" potable water circuit where a portion of the warmer water can be directed to reenter the aircraft potable water supply 42. In the "open" potable water flow circuit 40 shown in FIG. 5, a potable water flow is configured to, continuously or as needed, proceed out from the aircraft potable water supply, and reenter the aircraft potable water supply along the potable water circuit 40.

According to present aspects, FIG. 6 illustrates a "closed" system 300 comprising an aircraft potable water supply 42 where a selected amount of a potable water initial "charge" or bolus is released from the aircraft potable water supply 42 from potable water supply outlet 42b into the cool potable water circuit line 43 of potable water circuit 40 where the pre-released potable water flow enters pump inlet 44a of pump 44 and exits pump 44 at pump outlet 44b with the potable water flow in the potable water circuit 40 then directed into heat exchanger 46 at heat exchanger potable water inlet 46a. As with at least system 100 shown in FIG. 4, in system 300 the pump 44 can comprise suitable valving to open, on demand and/or otherwise respond as directed in response to a signal from, for example, a controller, for the purpose of directing pumped potable water from pump 44 at pump outlet 44b and onto heat exchanger potable water inlet 46a of heat exchanger 46. At heat exchanger 46, the cooler potable water having a temperature lower than air entering the heat exchanger absorbs heat from the warmer air, with the result being the cooling of the air and the warming of the potable water flow within at and/or within the heat exchanger. That is, as shown in FIG. 6, in system 300, a warmer or "warmed" potable water flow exits the heat exchanger from the heat exchanger potable water outlet 46b into the potable warmed water line 43a at a higher (e.g., elevated and/or/"warmed") temperature than the cooler temperature of the cooler potable water flow directed from the cool potable water supply 42 arriving at the heat exchanger.

The air flow exiting the heat exchanger has an air temperature that is lower (e.g., "cooler") than the warmer temperature of the air entering the heat exchanger. Accordingly, the air exiting the heat exchanger can be referred to as "pre-chilled" and/or "cooled" air that is then directed along and/or within the chilled air circuit 30 to the air chiller inlet 34a of air chiller 34. The air flow is further chilled in the air chiller 34 and exits at the air chiller outlet 34b, where chilled air circuit can further direct the chilled air to a cooling use or function such as the galley cart compartment, 20 via galley cart compartment air inlet 24 as shown in FIG. 6.

In another present aspect, FIG. 7 illustrates a "closed" system 400 that is a variant of system 300 shown in FIG. 6. System 300, as shown, routes a twice "warmed", or "potable further warmed water flow" from a galley cart compartment via a potable further warmed water line 43b onto galley water heating appliance 50 as a singular destination for a selected amount of the "twice-warmed" potable water flow. As shown in FIG. 7, system 400 comprises the system components shown in system 300, with the addition of a directional switch 60 (that can be a valve in communication with a controller). As shown in FIG. 7, system 400 at directional switch 60 can divert a selected amount of the "pre-warmed" potable water flow in the potable water circuit 40 to the galley water heating appliance, and can also divert a selected amount of the "pre-warmed" potable water flow in the potable water circuit 40 to pump inlet 44c of the pump 44 and back into potable water circuit 40. In system 400, the "pre-warmed" potable water flow can have more than the singular destination that the potable further warmed water flow is shown as having in system 300.

In another present aspect, FIG. 8 illustrates an "open" system 500 that is a variant of systems 300, 400 (shown in FIGS. 6, 7, respectively). As shown in FIG. 8, system 500 comprises many of the system components shown in system 400 (that are numbered similarly), and incorporates the addition of a directional switch 60 (that can be a valve in communication with a controller). Accordingly, as shown in FIG. 8, system 500 comprises directional switch 60 that can divert a selected amount of the "twice-warmed" potable water flow (the potable further warmed water flow) to the galley water heating appliance via potable further warmed water line 43b, and can also divert a selected amount of the "pre-warmed" potable water flow to the pump 44 and back into potable water circuit 40. In system 400, the "pre-warmed" potable water flow can have more than the singular destination that the "pre-warmed" potable water flow is shown as having in system 300.

A difference between systems 400 and 500 includes the relative placement and location within potable water circuit 40 of the potable water supply and the pump 44. As shown in FIG. 7, system 400 is configured to receive an initial potable water circuit "charge" of potable water (e.g., to "fill" the potable water circuit 40). System 400, in operation, can dispense the initial charge, and system 400 can further dispense additional selected amounts of potable water from potable water supply into the potable water circuit. However, as shown in FIG. 7, system 400 no amount of potable water flow is re-admitted from potable water circuit into the potable water supply 42. As explained herein, this system feature of system 400 (of not re-admitting a volume of water "back" into the potable water supply) renders and/or otherwise characterizes and/or otherwise defines system 400 as being a "closed" system with respect to the flow of potable water from the potable water supply. This "closed" system of system 400 shown in FIG. 7 presents a contrast to the "open" system presented in system 500, and shown in FIG. 8. That is, according to present aspects, system 500 is an "open" system variant of the "closed system presented in system 400.

As shown in FIG. 8, the aircraft potable water supply 42 comprises the potable water outlet 42b that is the point in system 500 where potable water is released from the potable water supply into the potable water circuit 40. In addition, according to present aspects, to be considered an "open" water circuit, as shown in FIG. 8, the potable water supply 42 of system 500 further comprises a potable water supply circuit inlet 42a into which a potable water flow from the potable water circuit 40 can be re-admitted to (e.g., can "re-enter") the potable water supply 42.

Accordingly, the present systems 100, 200, 300, 400, and 500 comprise an aircraft potable water supply that can be a discrete potable water supply dedicated to the present systems. More preferably, the present systems 100, 200, 300, 400, and 500 are placed into communication with an aircraft primary or main potable water supply that also can concurrently supply a potable water flow for other water uses and to other aircraft monuments such as sinks, toilets, fire suppression systems, etc.). As stated herein, the potable water supply is placed in communication with the present systems 100, 200, 300, 400, and 500 in a potable water circuit that is considered to be either an open circuit, or a closed circuit with respect to whether a potable water flow from the potable water circuit can reenter the potable water supply (considered to be an "open" water circuit system, and/or "open" system according to present aspects), or whether a potable water flow from the potable water circuit can is restricted from reentering the potable water supply (considered to be an "closed" water or "closed" system according to present aspects). That is, present systems 100, 300, and 400 are illustrated in FIGS. 4, 6, and 7, respectively, and are presented as "closed" systems. In contrast to the present "closed" systems of systems 100, 300, and 400, present systems 200 and 500 are illustrated in FIGS. 5 and 8, respectively, as "open" systems. In operation, in the "closed" systems, the cool potable water within the circuit may maintain a higher average potable water circuit temperature during water movement through the circuit as compared to an average potable water temperature in an "open" system.

According to present aspects, the present systems and present potable water circuits are configured to absorb, re-purpose, and redirect "waste" heat (that would otherwise be lost into a surrounding environment) to form a directed flow of "pre-heated" or "warmed" potable water, that can be provided as needed, and provided on demand, and otherwise admitted by a galley water heating appliance, and where the "pre-warmed" potable water flow admitted into the galley water heating appliance is then further heated by the galley water heating appliance to a final "hot" water temperature ranging from about 180° F. to about 212° F.

According to present aspects, the presence of the cool potable water circuit can enable the use of smaller components in the chilled air circuit and/or otherwise reduce the air chiller footprint in an aircraft, and/or otherwise reduce the power demand of an air chiller in an aircraft. According to present aspects, the present systems can result in the production of significantly less noise from the air cooling system, and the present systems can result in a significant reduction in the power drain (referred to equivalently herein as "power consumption" and "power demand") previously realized by typical air cooling systems. According to present aspects, as shown in FIGS. 4, 5, 6, 7, and 8, the cool potable water circuit is at least partially and/or indirectly responsible for cooling the airflow, with the cooled or chilled airflow configured to, for example, cool a galley cart compartment.

In each of systems 100, 200, 300, 400, and 500, the potable water circuit can be drained via drainage port 48 that can be located at pump 44, with drainage port 48 in communication with drainage line 48a. During a water circuit drainage operation, selected valving and valve positioning can be implemented to block potable water from entering the water circuit from the potable water supply. In addition, according to present aspects, in both of the "closed" and "open" systems described herein, the cool potable water circuit 40 can be initially charged with potable water when an aircraft, for example, is on the ground, concurrently with the filling of the cool potable water supply. This can prevent any depletion in aircraft potable water supply for the purpose of operating of the present galley cart cooling systems.

According to present aspects, the temperature of the potable water flow in the potable water circuit introduced to the heat exchanger can be selected to maintain a temperature range over the circuit that, according to one example, can range from about 32° F. to about 50° F. In another example, the temperature of the potable water flow in the potable water circuit can be selected to maintain a temperature range over the circuit that, according to one example, can range from about 35° F. to about 45° F.

According to present aspects, the temperatures of the potable water in the potable water circuit can be altered to achieve a selected cool or cold temperature range by, for example, varying the degree of insulation used to insulate the potable water circuit and the aircraft potable water supply located below a passenger cabin and subjected to cold ambient temperatures during flight. In addition, selected temperatures of the potable water flow in the circuit can be selected and controlled by providing varied flow velocity provided to the water flow by the pump, and/or by providing, for example, agitation or aeration to the water flow (e.g., by provided surface features to an interior flow through pathway of a circuit line in the water circuit to induce, for example, a selected cavitation, etc.

According to present aspects, the temperature range of the potable water in the aircraft potable water supply can be selected to provide augmented cooling to a chilled air circuit in a heat exchanger, with the chilled air circuit responsible, for example, for preserving galley cart contents (e.g., food for human consumption) in a galley cart compartment, at a storage temperature for a flight duration that is considered to be safe and that will retard the growth of harmful pathogens and/or bacterial growth that can grow exponentially when temperatures are allowed to rise above 45° F. for an extended period, for example.

FIGS. 4, 5, 6, 7, and 8 further show an optional warmed water holding tank placed into the potable water circuit 40. As shown in FIGS. 4 and 5, if desired, a warmed water flow in the potable warmed water line 43a can be completely or partially diverted into a warmed water holding tank inlet 70a of a warmed water holding tank 70 located in systems 100, 200 downstream from the heat exchanger and upstream from the galley water heating appliance. When desired, a flow of warmed water from the warmed water holding tank can be released from the warmed water holding tank outlet 70b of the warmed water holding tank 70 and reintroduced into the potable warmed water line 43a (not shown in FIGS. 4 and 5) or directly delivered into the galley water heating appliance.

As shown in FIGS. 6, 7, and 8, if desired, a further warmed water flow in the potable further warmed water line 43b can be completely or partially diverted into a further warmed water holding tank inlet 72a of a further warmed water holding tank 72 located in systems 300, 400, 500 downstream from the galley cart compartment and upstream from the galley water heating appliance. When desired, a flow of warmed water from the further warmed water holding tank 72 can be released from the warmed water holding tank outlet 72b of the warmed water holding tank 72 and reintroduced into the potable further warmed water line 43b (not shown in FIGS. 4 and 5) or directly delivered into the galley water heating appliance.

Although not shown in FIGS. 4, 5, 6, 7, and 8, suitable valving, controllers, etc. can be incorporated into and in communication with the potable warmed water line 43a and the potable further warmed water line 43*b* to effect a diverted water flow into and out from the holding tanks 70, 72. In present examples, the warmed water holding tank can direct a warmed water flow or further warmed water flow from the holding tank via a holding tank outlet directly into the galley water heating appliance. In another example, although not shown, the warmed water holding tank can direct a warmed water flow or a further warmed water flow from the holding tank back into a warmed water flow line 43*a* or further warmed water flow line 43*b* that then proceeds into the galley water heating appliance.

According to present aspects, the warmed water holding tank (referred to equivalently herein as a "galley holding tank") can be located outside of or can be integrated within or located in close proximity to the galley water heating appliance and can be located within the present systems within a cabin temperature environment to collect, retain, and dispense on demand a selected dispensed volume of prewarmed water "hot" water from the refrigeration system's highest heat transfer temperature operation while, for example, the aircraft is on the ground (e.g., pre-flight).

According to a present aspect, the warmed water holding tank can act as a thermal battery, with the prewarmed water in the holding tank available for initial and or "second fill" of beverage makers and beverage maker tanks during, for example, the initial beverage service in flight. According to one present aspect, at this time in the flight cycle, the refrigeration system would be in a "steady state" operation, with, for example, the heat directed by the present system from the heat exchanger to the water tank being less than the on-ground temperature pull down operational phase. According to present aspects, the warmed water holding tank can be a vessel configured to preserve warmed temperatures of the warmed water flow content (e.g., "retard" the loss of heat and/or otherwise inhibit or "slow" the cooling of the warmed and further warmed water contained within the warmed water holding tank), with the warmed water holding tank made from a thermally-insulative material and/or with the warmed water holding tank comprising a thermally-insulative coating to inhibit heat loss of the warmed water held in and proceeding through the holding tank, with the thermally-insulative material and/or coating configured to maintain and/or not otherwise interfere with the potability of the warmed water).

FIG. 9, is a representative partially exposed view of a heat exchanger 46 of the type that can be incorporated into the circuits and systems described herein, and according to present aspects, with the understanding that pathway and inlet and outlet locations can vary to accommodate selected positioning of circuit lines for selected systems, etc. As shown in FIG. 9, according to present aspects, the cool potable water flow from the cool potable water circuit 40 is introduced at heat exchanger potable water inlet 46*a* into and otherwise enters into and passes through the heat exchanger 46 and exits the heat exchanger from the heat exchanger potable water outlet 46*b* at a slightly "warmer" and/or less "cooled" potable water flow/circuit temperature; as the cool potable water flow, within the heat exchanger, encounters an airflow in the heat exchanger at a "warmer" temperature (a temperature that is "warmer" than the cool potable water flow temperature) such that the "warmer" airflow releases waste heat (and is "cooled" by the potable water flow) with the airflow "cooled", and with the airflow exiting the heat exchanger at a lower, "cooler" temperature. As shown in FIG. 9, the airflow entry into the heat exchanger is represented by the large, shaded arrow entering heat exchanger air inlet 46*c*, and the "cooler" airflow exit from the heat exchanger at the heat exchanger air outlet 46*d* represented by the large, unshaded arrow.

If further chilling of the cool potable water is desired, for example, within "closed" systems that can sustain a greater water temperature variation over time, a water chiller that can be, for example, a water-chilled blanket-type device can be integrated into a cool potable water circuit of the systems presented herein to, for example, re-chill the potable water in the potable water supply in the circuit with such water chiller positioned, for example, upstream of the heat exchanger.

With respect to chilled air circuit 30 shown in FIGS. 4, 5, 6, 7 and 8, and as described herein, the air circuit may not be enclosed in an enclosed physical apparatus or "line", but instead, the air "circuit" represents a directional airflow created in open space that can be directed by fans, etc., and with the arrows shown in the air circuit 30 indicating the directional flow of the air along the "circuit" 30. In other aspects, an airflow can be directed into and out from a physical air flow line (e.g., an air conduit), that can be, for example, a duct, pipe, tubing, etc.

FIGS. 10, 11, and 12 are flowcharts outlining present methods according to present aspects. FIG. 10 outlines a present method 1000 for providing an at least partially pre-heated water bolus to an aircraft galley water heating appliance, with the method 1000 including directing 1002 at least an initial charge of a potable water flow from an aircraft potable water supply into an aircraft potable water circuit, with the potable water supply including a potable water supply temperature that is at a temperature below an aircraft cabin ambient temperature, said potable water circuit comprising a heat exchanger. The method 1000 can further include positioning 1004 the heat exchanger in close proximity to an air chiller air return of an air chiller, with the air chiller return in communication with a chilled air circuit, warming 1006 the potable water flow at the heat exchanger to form a potable warmed water flow leaving the heat exchanger in the potable water circuit, with method 1000 further including directing 1008 the potable warmed water flow from the heat exchanger in the potable water circuit to an aircraft galley water heater of an aircraft galley water heating appliance, with the warmed potable water flow delivered to the aircraft galley water heater as an a preheated potable water bolus. In the method outlined in FIG. 10, according to method 1000, the potable warmed water flow is warmed to an average potable warmed water flow temperature ranging from about 65° F. to about 75° F.

FIG. 11 outlines a present method 1100 for providing an at least partially pre-heated water bolus to an aircraft galley water heating appliance, with the method 1100 including the steps of method 1000 set forth herein, and with method 1100 further including directing (1102) chilled air from a chilled air circuit to an aircraft galley cart compartment, with the chilled air circuit comprising the air chiller. In the method outlined in FIG. 11, according to method 1100, the potable warmed water flow is warmed to an average warmed water flow temperature ranging from about 65° F. to about 75° F.

FIG. 12 outlines a present method 1200 for providing an at least partially pre-heated water bolus to an aircraft galley water heating appliance, with the method 1200 including the steps of method 1000 and method 1100 set forth herein, and with method 1200 further including directing 1202 the potable warmed water flow from the heat exchanger to an aircraft galley cart compartment, further warming (1204) the potable warmed water flow at the aircraft gally cart compartment to form a potable further warmed water flow, and directing (1206) the potable further warmed water flow in the potable water circuit from the aircraft galley cart compartment to the aircraft galley water heating appliance as the pre-heated potable water bolus. In the method outlined in FIG. 121, according to method 1200, the warmed potable water flow is warmed to an average warmed water flow temperature ranging from about 65° F. to about 75° F.

The methods 1000, 1100, and 1200 as shown in FIGS. 10, 11, and 12 (respectively) can incorporate one or more of the systems 100, 200, 300, 400, and 500 shown in FIGS. 4, 5, 6, 7, and/or 8 (respectively).

The systems, apparatuses, and methods described herein can further incorporate system controllers, sensors, detectors, thermostats, processors, alarms, shutoffs, additional valving, etc., and that can further include attendant processors, hardware and software, etc. to monitor, control, regulate, and/or alter one of more features of the cool potable water circuit and chilled air circuit either manually, automatically, remotely, etc. The addition of controllers, sensors, thermostats, actuators, alarms, "fail safes", etc., to the present systems can be in communication with readouts and/or can be in communication with automated electrical circuits to, for example, monitor and adjust temperatures of the air flow and temperatures of the potable water flow at one or more points along and throughout the air circuit and cool potable water circuit, including the temperature of the potable water supply, such that the air circuit and potable water circuit can be monitored in real time.

For example, if a temperature deviation from expected values arises and is detected, the configured and incorporated monitoring devices, and supporting software/hardware/processors can be configured to initiate actions on the water and air circuits to alter airflow and/or potable water flow velocities; change potable water circuit configurations from closed to open systems functioning, etc., for the purpose of, for example, returning a selected temperature range value to optimal operating temperatures, etc. Peripheral sensors, detectors, etc., can further include routine system "checks" on the components of the circuits (e.g., pump performance, system pressure, heat exchange performance, chiller performance, etc.) that can occur at scheduled maintenance intervals as well as occurring at throughout a flight, as a circuit cooling system is initiated, and further including a continuous cooling system monitoring in real time that can include leakage detection as well as temperature variation, etc.

The present aspects may, of course, be carried out in other ways than those specifically set forth herein without departing from essential characteristics of the present disclosure. The present aspects are to be considered in all respects as illustrative and not restrictive, and all changes coming within the meaning and equivalency range of the appended claims are intended to be embraced therein.

What is claimed:

1. A system for repurposing waste heat produced in an aircraft air chilling circuit the system comprising:
   a chilled air circuit comprising an air chiller, said air chiller comprising an air chiller air return, said chilled air circuit configured to produce a chilled airflow;
   a heat exchanger positioned in proximity to the air chiller air return, said heat exchanger in communication with the chilled air circuit;
   a potable water circuit in communication with the heat exchanger, said potable water circuit comprising:
      an aircraft potable water supply in communication with the potable water circuit, said aircraft potable water supply configured to provide at least an initial charge of potable water flow to form a potable water flow in the potable water circuit, said aircraft potable water supply comprising an ambient aircraft potable water supply temperature;
   a potable warmed water flow line in communication with the potable water circuit, said potable warmed water flow line positioned downstream from the heat exchanger, said potable warmed water flow line configured to deliver a potable warmed water flow from the heat exchanger in the potable water circuit;
   an aircraft galley water heating appliance in communication with the potable warmed water flow line; and
   wherein, in operation, the potable water circuit is a potable water closed circuit, said potable water closed circuit further comprising a valve, said valve positioned between the aircraft potable water supply and the potable water circuit, and wherein said valve is configured to move from an open position to a closed position to maintain a closed initial potable water charge within the potable water closed circuit.

2. The system of claim 1 further comprising, a potable warmed water holding tank in communication with the potable warmed water flow line at a point downstream from the heat exchanger.

3. The system of claim 1, wherein the aircraft galley water heating appliance is at least one of an aircraft galley coffee maker, an aircraft galley water boiler, and an aircraft galley steam oven.

4. The system of claim 1, wherein the chilled air circuit is in communication with the potable water circuit.

5. The system of claim 1 wherein the potable warmed water flow line of the potable water circuit is in communication with the aircraft galley water heating appliance, said potable water circuit configured to provide a potable warmed water flow to the aircraft galley water heating appliance, said potable warmed water flow comprising a selected potable warmed water flow temperature ranging from about 65° F. to about 75° F.

6. The system of claim 1, wherein the potable water circuit is in communication with the chilled air circuit, said potable water circuit configured to augment cooling air in the chilled air circuit.

7. The system of claim 1, further comprising:
   an aircraft galley cart compartment, wherein said potable water circuit is in direct contact with said aircraft galley cart compartment, said aircraft galley compartment configured to further increase the temperature of the potable warmed water flow directed to the aircraft galley cart compartment to a higher potable warmed water temperature within the aircraft galley cart compartment.

8. The system of claim 7 further comprising, a potable warmed water holding tank in communication with the potable warmed water flow line at a point downstream from the aircraft galley cart compartment.

9. The system of claim 7, wherein said chilled air circuit is further in direct contact with the aircraft galley cart compartment.

10. An aircraft comprising the system of claim 7.

11. An aircraft comprising the system of claim 1.

12. A method for providing an at least partially pre-heated water bolus to an aircraft galley water heating appliance, the method comprising:
   directing at least an initial charge of a potable water flow from an aircraft potable water supply into a potable water circuit, said aircraft potable water supply comprising a potable water supply temperature that is at a temperature below an aircraft cabin ambient temperature, said potable water circuit comprising a heat exchanger;

warming the potable water flow at the heat exchanger to a selected temperature ranging from about 65° F. to about 75° F. to form a potable warmed water flow leaving the heat exchanger in the potable water circuit; and directing the potable warmed water flow from the heat exchanger in the potable water circuit to an aircraft galley water heater, said potable warmed water flow delivered to the aircraft galley water heater as a pre-heated potable water bolus; and wherein, in operation, the potable water circuit comprises a potable water closed circuit.

13. The method of claim 12, wherein the potable water supply maintains an average temperature ranging from about 35° F. to about 77° F. and the potable warmed water flow leaving the heat exchanger in the potable water circuit comprises an average potable warmed water flow temperature ranging from about 65° F. to about 75° F.

14. The method of claim 12, further comprising:
directing chilled air from a chilled air circuit to an aircraft galley cart compartment, said chilled air circuit comprising an air chiller.

15. The method of claim 12, further comprising:
directing the potable water flow from the heat exchanger to an aircraft galley cart compartment;
further warming the potable warmed water flow at the aircraft gally cart compartment to form a potable further warmed water flow; and
directing the potable further warmed water flow in the potable water circuit from the aircraft galley cart compartment to the aircraft galley water heater to form the pre-heated potable water bolus.

16. The aircraft galley water heating appliance configured to receive the pre-heated water bolus according to the method of claim 15.

17. An aircraft comprising the aircraft galley water heating appliance, said aircraft water heating appliance an aircraft water-heating appliance configured to receive the pre-heated water bolus according to the method of claim 15.

18. The aircraft galley water heating appliance configured to receive the pre-heated water bolus according to the method of claim 12.

19. An aircraft comprising the aircraft galley water heating appliance, said aircraft galley water heating appliance configured to receive the pre-heated water bolus according to the method of claim 12.

* * * * *